United States Patent
Dzikowicz

(10) Patent No.: US 8,973,425 B2
(45) Date of Patent: Mar. 10, 2015

(54) SEAL INTEGRITY EVALUATION DEVICE AND METHOD OF USE THEREOF

(75) Inventor: Anthony Edward Dzikowicz, Grand Haven, MI (US)

(73) Assignee: Nestec S.A., Vevey (CH)

(*) Notice: Subject to any disclaimer, the term of this patent is extended or adjusted under 35 U.S.C. 154(b) by 428 days.

(21) Appl. No.: 13/519,671

(22) PCT Filed: Dec. 8, 2010

(86) PCT No.: PCT/US2010/059355
§ 371 (c)(1),
(2), (4) Date: Nov. 29, 2012

(87) PCT Pub. No.: WO2011/081801
PCT Pub. Date: Jul. 7, 2011

(65) Prior Publication Data
US 2013/0118233 A1    May 16, 2013

Related U.S. Application Data

(60) Provisional application No. 61/290,773, filed on Dec. 29, 2009.

(51) Int. Cl.
*G01M 3/40* (2006.01)
*G01M 3/16* (2006.01)

(52) U.S. Cl.
CPC ................................ *G01M 3/40* (2013.01)
USPC .................................. 73/49.3; 73/40; 73/49.2

(58) Field of Classification Search
CPC ......... G01M 3/16; G01M 3/3281; G01M 3/40
USPC ....................................................... 73/40–49.8
See application file for complete search history.

(56) References Cited

U.S. PATENT DOCUMENTS

| | | | |
|---|---|---|---|
| 3,855,531 A | | 12/1974 | Fielibert et al. |
| 3,958,448 A | * | 5/1976 | Willis et al. ........................ 73/37 |
| 3,981,701 A | * | 9/1976 | Andersen et al. ............... 62/46.1 |
| 4,089,208 A | * | 5/1978 | Franks et al. ................... 73/45.5 |
| 4,125,805 A | * | 11/1978 | Nagamatsu et al. ........... 324/558 |

(Continued)

FOREIGN PATENT DOCUMENTS

| | | | | |
|---|---|---|---|---|
| EP | 1267157 A2 | * | 12/2002 | ............. G01N 27/20 |
| JP | 57127830 | | 8/1982 | |
| WO | WO 0175414 A1 | * | 10/2001 | |

OTHER PUBLICATIONS

International Search Report and Written Opinion from priority PCT Application No. PCT/US2010/059355 dated Feb. 8, 2011.

*Primary Examiner* — David A Rogers
(74) *Attorney, Agent, or Firm* — Gary M. Lobel

(57) ABSTRACT

Apparatuses for evaluating the integrity of a container seal and methods of using same are provided. The apparatuses include a sealed container having a conductive fluid and a first probe therein, a conductive solution bath having a second probe therein, a conductivity meter and a pressurized fluid supply. A pressurized fluid is supplied from fluid supply to an interior of the sealed container through the first probe until the seal on sealed container ruptures, first and second probes create an electrical circuit, and the conductivity meter detects a flow of electrons between the two probes. In this manner, apparatuses of the present disclosure are able to quantify the amount of internal pressure in the container at the time the container seal ruptures.

28 Claims, 2 Drawing Sheets

(56) References Cited

U.S. PATENT DOCUMENTS

| | | | |
|---|---|---|---|
| 4,135,384 A * | 1/1979 | Burwell et al. | 73/40.7 |
| 4,437,353 A * | 3/1984 | Hamerlinck | 73/863.81 |
| 4,555,935 A * | 12/1985 | Elert | 73/52 |
| 4,733,555 A | 3/1988 | Franks | |
| 4,864,848 A * | 9/1989 | Irvine | 73/45.4 |
| 4,909,069 A * | 3/1990 | Albin et al. | 73/40 |
| 5,123,278 A * | 6/1992 | McKittrick | 73/52 |
| 5,214,387 A * | 5/1993 | Fenner | 324/557 |
| 5,327,784 A * | 7/1994 | Venkatesan et al. | 73/714 |
| 5,333,492 A * | 8/1994 | Aarts | 73/49.3 |
| 5,507,177 A * | 4/1996 | Focke | 73/49.3 |
| 5,510,718 A * | 4/1996 | Enderby | 324/536 |
| 5,535,618 A | 7/1996 | Konieczka | |
| 5,760,295 A * | 6/1998 | Yasumoto | 73/49.3 |
| 6,288,554 B1 * | 9/2001 | Yasumoto | 324/558 |
| 6,415,651 B1 * | 7/2002 | Leonard et al. | 73/49.2 |
| 6,526,810 B2 * | 3/2003 | Konieczka | 73/49.8 |
| 6,634,216 B1 * | 10/2003 | Yasumoto | 73/49.3 |
| 2002/0066303 A1 | 6/2002 | Konieczka | |
| 2006/0112758 A1 * | 6/2006 | Chang et al. | 73/40 |
| 2007/0220956 A1 * | 9/2007 | Terentiev | 73/49.2 |
| 2009/0235722 A1 * | 9/2009 | Terentiev | 73/40 |

* cited by examiner

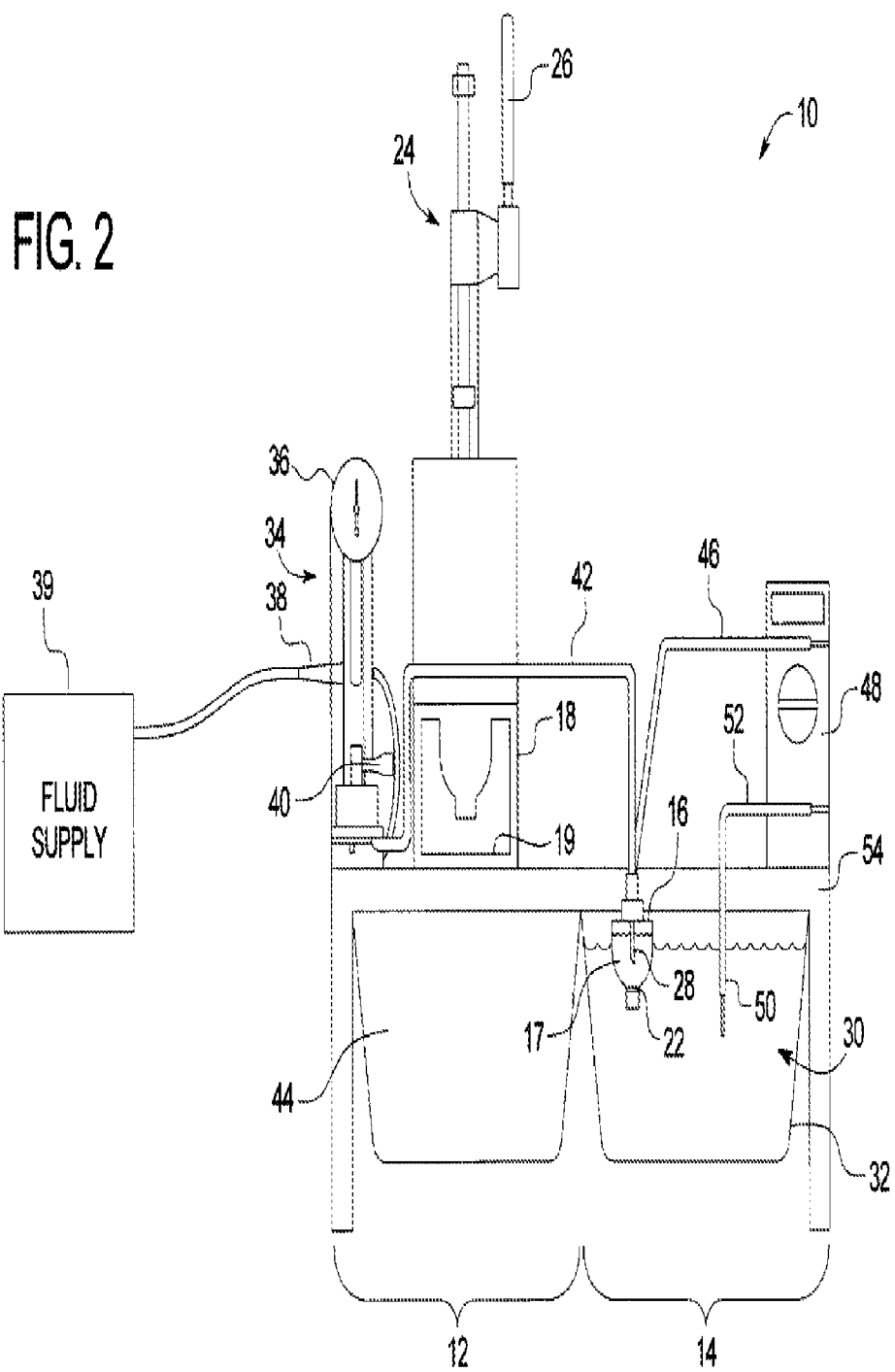

SEAL INTEGRITY EVALUATION DEVICE AND METHOD OF USE THEREOF

BACKGROUND

The present disclosure generally provides apparatuses for evaluating the integrity of a container seal. More particularly, the present disclosure provides apparatuses for evaluating the seal integrity of liquid-filled containers of varying sizes, and methods for evaluating such seals.

Containers with resealable closures are used throughout the food and beverage industry. The closures are designed to prevent product leakage and yet they must also provide the user with easy open access to the contents of the container. Resealable closures are appropriate when the container contents are beverages or food products because these closures enable consumers to dispense a desired portion of the beverage or food product and then reseal the remainder of the product for later consumption. One problem with this type of sealed container is leakage, which is more common, for example, with plastic containers.

For plastic containers, the leaks are primarily attributable to processing conditions such as heat exposure, finish abrasions, fill temperature, head space, pull-up range, and inversion. When the seal on a plastic container fails, the liquid or food contents of the container can become contaminated and the container is not suitable for sale to the public. As a result, the container and the contents must be discarded with the manufacturer experiencing a reduction in product output.

U.S. Pat. No. 5,535,618 to Konieczka ("the '618 patent") discloses a destructive method for testing for leaks in sealed containers. The method of that invention includes measuring for electrical conductivity between contents of a sealed container and an electrolyte solution in which the container is partially immersed. The method disclosed in the patent detects a container seal leak if there is electric current flowing from an electrode in a solution to a second electrode positioned within the container contents. Conversely, if no electric current flow is detected, then the container seal is not leaking.

A device currently used in accordance with the teachings of the '618 patent for testing container seals requires the operator to perform two distinct, time consuming steps. In a first jig, the operator must pierce a surface of the container with a drill bit mounted in a drill press. Next, the operator must transport the container to a testing device and properly secure the container before beginning the testing procedure. Since the liquid contents of the container can be spilled while transporting the pierced container, the device has an inherent level of imprecision which can affect the accuracy of test results and the verification of earlier test results. In addition, the components comprising the testing devices are numerous and are not integrated into a single apparatus. As a result, the testing device is inefficiently packaged and consumes a disproportionate amount of workspace. Also, because the prior device is immobile, the operator is precluded from repositioning the testing device or temporarily moving the testing device closer to or away from the container production line.

The prior conventional test apparatus of the '618 patent employs a manually moved member to secure and deform the container during the test process. In the conventional apparatus, developing the necessary force to deform or squeeze the container requires muscular exertion by a human operator. Accordingly, the manually moved member is subject to variation based upon the individuality of the operation and the operator, which further reduces the precision of the testing results. Also, during the course of a typical day, the operator can experience some fatigue when repeatedly applying the necessary muscular exertion to the manually moved member. Further, the manually moved member (i.e., a hand crank) requites a significant time element to operate, which further reduces the sampling rate of the device. Moreover, because an external pressure source is used by the apparatus of the '618 patent, and because the rigidity of plastic containers can vary, the amount of pressure inside the container cannot be quantified at the point of seal rupture.

SUMMARY

The present disclosure provides an apparatus for an electroconductivity test. The apparatus and method involves inserting one probe (e.g., electrode) into a sealed container (filled with a conductive water/salt solution) and a second probe (e.g., electrode) placed in a conductive water/salt solution bath. The container is then internally pressurized with a fluid such as, for example, air or water until electroconductivity is observed between the two probes. The apparatus is used in the evaluation and qualification of new packages and package seal quality.

In a general embodiment, apparatuses for evaluating the integrity of a container seal are provided. The apparatus includes a holder so constructed and arranged to receive a container having a seal and containing an electrolyte product, a probe actuating device having a first probe removably attached to a lower portion thereof, the first probe having a tip portion that is so constructed and arranged to puncture the container when the probe actuating device is actuated, a fluid supply fluidly connected to the first probe, an electrolyte bath having a second probe at least partially immersed therein, and a conductivity meter connected to the first probe and the second probe.

In an embodiment, the first probe is attached by attachment means selected from the group consisting of magnetic, adhesive, or combinations thereof. The first probe may further have a hollow cylindrical shape that is so constructed and arranged to deliver a fluid from the fluid supply to an interior of the container.

In an embodiment, the first probe and the second probe are electrodes.

In an embodiment, the container and the container seal are made of non-conductive materials selected from the group consisting of plastic, glass, foil, or combinations thereof. The seal may be a screw-on plastic cap.

In an embodiment, the electrolyte product is selected from the group consisting of fruit juice, flavored water, a pediatric electrolyte drink, carbonated beverages and teas, isotonic beverages, or combinations thereof.

In an embodiment, the electrolyte bath includes water and an electrolyte selected from the group consisting of aluminum chloride, citric acid, potassium chloride, sodium chloride, or combinations thereof.

In an embodiment, the probe actuating device is a press that is actuated by means selected from the group consisting of manually, mechanically, electrically, or combinations thereof.

In an embodiment, the apparatuses include a mobile platform.

In another embodiment, apparatuses for evaluating the integrity of a container seal are provided. The apparatuses include a holder for receiving a container having a seal and containing an electrolyte product, a probe actuating device having a first hollow probe attached to a lower portion thereof, the first hollow probe having a tip portion that is so constructed and arranged to puncture the container, a fluid supply fluidly connected to the first hollow probe, the fluid supply so constructed and arranged to deliver a pressurized fluid to an interior of the container through a fluid supply tube and the first hollow probe, an electrolyte bath having a second probe at least partially immersed therein, and a conductivity meter connected to each of the first hollow probe and the second probe.

In an embodiment, the first hollow probe is a removable probe attached to the probe actuating device by attachment means selected from the group consisting of magnetic, adhesive, or combinations thereof.

In an embodiment, the first hollow probe and the second probe are electrodes.

In an embodiment, the container and the container seal are made of non-conductive materials selected from the group consisting of plastic, glass, foil, or combinations thereof. The seal may be a screw-on plastic cap.

In an embodiment, the electrolyte product is selected from the group consisting of fruit juice, flavored water, a pediatric electrolyte drink, carbonated beverages and teas, isotonic beverages, or combinations thereof.

In an embodiment, the electrolyte bath includes water and an electrolyte selected from the group consisting of aluminum chloride, citric acid, potassium chloride, sodium chloride, or combinations thereof.

In an embodiment, the probe actuating device is a press that is actuated by means selected from the group consisting of manually, mechanically, electrically, or combinations thereof.

In an embodiment, the apparatuses further include a mobile platform.

In yet another embodiment, methods for evaluating the integrity of a container seal is provided. The methods include actuating a probe actuating device having a first removable probe thereon in a direction that is toward a container having a seal and containing an electrolyte product, inserting the first removable probe into the container such that the first removable probe is at least partially immersed in the electrolyte product, separating removable probe from probe actuating device, placing the container having the first removable probe therein into an electrolyte bath such that at least the seal of the container is immersed in the electrolyte bath, the electrolyte bath having a second probe at least partially immersed therein, connecting each of the first and second probes to a conductivity meter, and measuring an electrical conductivity from one probe to another using the conductivity meter, wherein the seal is not leaking if there is no measured flow of electrons from one probe to the other, and the seal is leaking if there is a flow of electrons from one probe to the other.

In an embodiment, the methods further include puncturing the container with the removable probe. The removable probe may be hollow and may be attached to a fluid supply by a fluid supply tube.

In an embodiment, the methods further include supplying a pressurized fluid from the fluid supply to an interior of the container through the fluid supply tube and hollow removable probe.

In an embodiment, the methods further include measuring an internal pressure in the container using a pressure gauge at a time when the conductivity meter begins to measure an electrical conductivity from one probe to the other.

In still yet another embodiment, methods for evaluating the integrity of a container seal are provided. The methods include actuating a probe actuating device having a first probe thereon in a direction that is toward a container having a seal and containing an electrolyte product, the first probe having a hollow cylindrical shape and being fluidly connected to a fluid supply by a fluid supply tube, inserting the first probe into the container such that a portion of the first probe is at least partially immersed in the electrolyte product. placing the container having the first probe therein into an electrolyte bath such that at least the seal of the container is immersed in the electrolyte bath, the electrolyte bath having a second probe at least partially immersed therein, connecting the first and second probes to a conductivity meter, detecting an electrical conductivity from one probe to another using the conductivity meter, wherein the seal is not leaking if there is no measured flow of electrons from one probe to the other, and the seal is leaking if there is a flow of electrons from one probe to the other, supplying a pressurized fluid from the fluid supply to an interior of the container through the fluid supply tube and the first hollow probe if no measured flow of electrons from one probe to the other is detected, and measuring an internal pressure in the container using a pressure gauge at a time when the conductivity meter begins to measure an electrical conductivity from one probe to the other.

In an embodiment, the methods further include puncturing the container with the first probe. The first probe may be a removable probe that is removably attached to the probe actuating device.

In an embodiment, the methods further include separating removable probe from probe actuating device prior to placing the container having the first probe therein into the electrolyte bath.

It is an advantage of the present disclosure to provide improved apparatuses for evaluating the integrity of a container seal.

It is another advantage of the present disclosure to provide apparatuses having a removable probe or electrode.

It is yet another advantage of the present disclosure to provide apparatuses configured for delivery of a pressurized fluid to an interior of a sealed container.

It is still yet another advantage of the present disclosure to provide improved methods for evaluating the integrity of a container seal.

It is an advantage of the present disclosure to provide improved methods for quantifying an internal container pressure at which a container seal ruptures.

Additional features and advantages are described herein, and will be apparent from the following Detailed Description and the figures.

BRIEF DESCRIPTION OF THE FIGURES

FIG. 2 illustrates a side view of an apparatus in accordance with an embodiment of the present disclosure.

DETAILED DESCRIPTION

Figure 1:
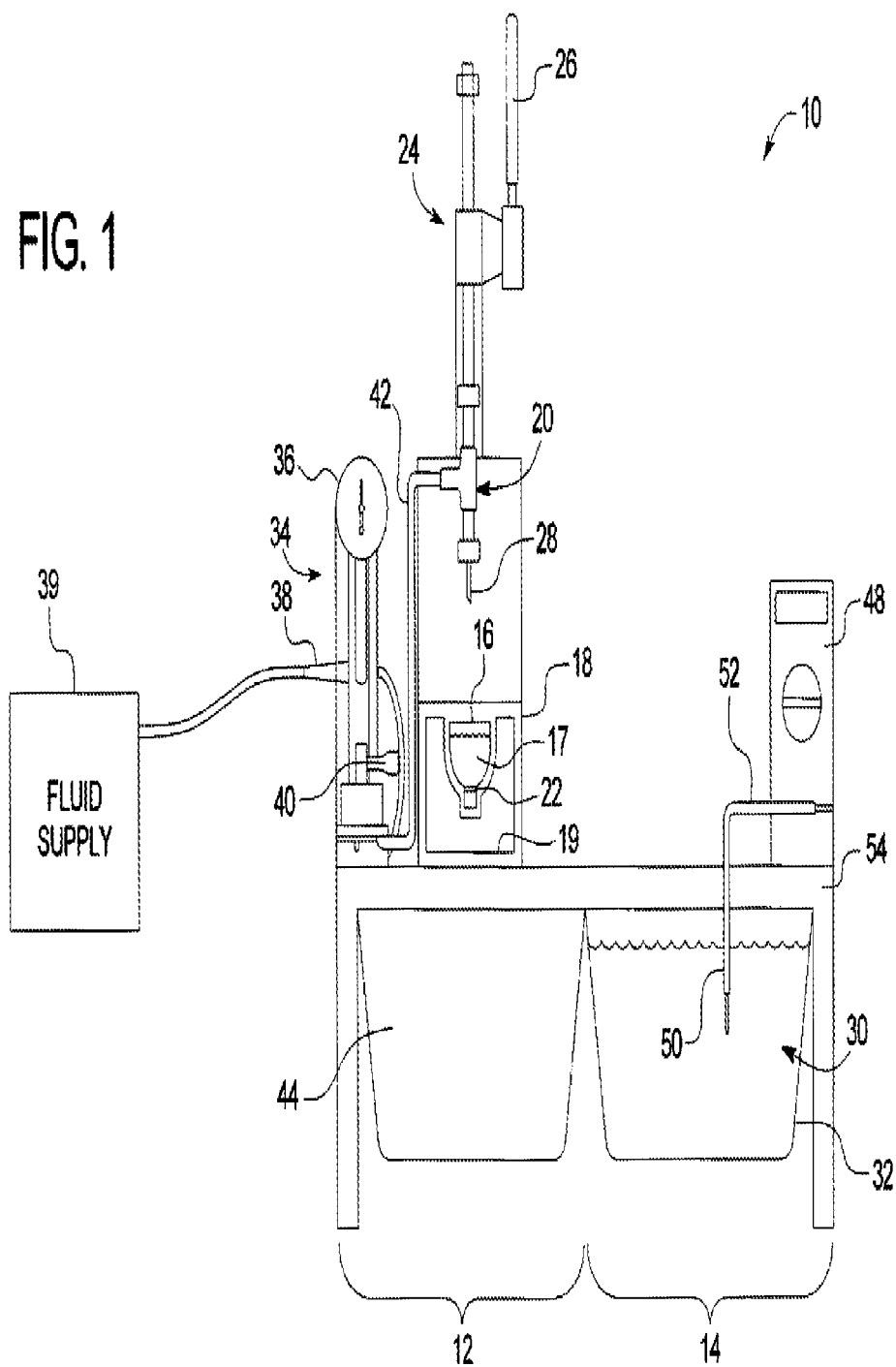
FIG. 1 illustrates a side view of an apparatus in accordance with an embodiment of the present disclosure.

While the invention is susceptible of embodiment in many different forms, there is shown in the drawings and will herein be described in detail preferred embodiments of the invention. It is to be understood that the present disclosure is to be considered as an exemplification of the principles of the invention. This disclosure is not intended to limit the broad aspect of the invention to the illustrated embodiments.

As illustrated in FIG. 1, an apparatus 10 of the present disclosure is shown. Apparatus 10 includes, for example, a container preparation portion 12 and a seal integrity testing portion 14. In the container preparation portion 12, a container 16 having a seal may be inverted and placed into a block holder 18 that is configured to hold container 16 while a probe 20, or first electrode, is inserted therein. In an embodiment, block holder 18 includes a means for engaging containers of different sizes. The engaging means permits the apparatus to test different sized containers, i.e. large and small containers, thereby increasing the versatility and value of apparatus 10. In an embodiment, the means comprises at least one insert 19, each with an engaging surface or a plurality of engaging surfaces.

Insert 19 can be removably attached to block holder 18. Insert 19 enhances the ability of block holder 18 to engage containers of different shapes and sizes. The number, size, and configuration of inserts 19 can vary depending on the size and shape of the container. Insert 19 has an engaging surface which comes into direct contact with an outer surface of container 16 as block holder 18 engages container 12. One of ordinary skill in the art will recognize that insert 19 could be integrated into block holder 18 to form an integral structure, the integral structure having a distinct engaging surface that contacts an outer surface of container 16. Alternatively, insert 19 could be removably set into block holder 18 and configured to be changed in order to allow containers 16 of different sizes to be tested.

The various configurations of insert 19 enable apparatus 10 to evaluate seals 22 on containers 16 of different sizes and shapes. Specifically, apparatus 10 is capable of evaluating containers 16 with capacities ranging from 1 to 128 ounces. However, by increasing the size of the components of apparatus 10 can be used to evaluate containers larger than 128 ounces. In an embodiment, apparatus 10 is capable of evaluating containers 16 with capacities of about 4 ounces. Also, apparatus 10 is capable of evaluating containers other than circular, including containers that are ellipsoidal, square, triangular, or rectangular. However, it may be desired to modify certain features, such as the shape of insert 19 and holding block 18 to better accommodate a particular shape. For example, at least one insert 19 could define a "V" shape to better accommodate a triangular-shaped container. The ability to evaluate containers 16 of varying size and shape increases the versatility and value of apparatus 10. Moreover, apparatus 10 uses pressurized fluid to provide an accurate and relatively immediate feedback of the actual pressure in the sealed container 16, which provides a quantifiable burst pressure value at point of failure. This, in turn, provides a means of quantifying the quality or robustness of the seal in addition to pass/fail result.

As mentioned above, sealed container 16 of the present disclosure has a seal 22 that can be opened. Seal 22 prevents leakage of an electrolyte solution 17 contained in container 16. Electrolyte solution 17 may be a beverage of some kind including, for example, fruit juice, flavored water, a pediatric electrolyte drink, carbonated beverages and teas, isotonic beverages, etc. Regardless, the beverage or liquid contained in container 16 includes at least one electrolyte such as, but not limited to, potassium chloride, sodium citrate, sodium chloride, or combinations thereof. Electrolyte solution 17 may also include a carbohydrate including, for example, sucrose, glucose, fructose, maltodextrins, or combinations thereof. In an embodiment, the present apparatuses 10 could also be used to test the integrity of a seal on a container containing foods such as purees, yogurts, etc. As such, the skilled artisan will appreciate that apparatus 10 is not limited to use with the specific electrolyte solutions discussed above.

The seal 22 and sealed container 16 do not conduct electricity. Accordingly, container 16 and seal 22 may be made of a material or materials that do not conduct electricity, or container 16 and seal must be electrically insulated. In an embodiment, seals 22 of the present disclosure may include, but are not limited to, plastic caps, plastic lids, foil induction seals, pull tab seals, crown caps for bottles, tear cap seals, laminated flexible seals, resealable seals, foil conduction seals, etc. In an embodiment, seal 22 is a resealable seal that can be closed to provide a leak seal to prevent leakage of an electrolyte solution contained therein. Examples of resealable seals include, for example, snap-open and push-pull closures, screw-on metal and plastic lids and caps, and spray pump nozzles with screw-on metal and plastic lids and caps. The skilled artisan will appreciate, however, that the containers and seals tested using the present apparatuses need not be resealable containers and may include, for example, non-resealable containers and containers with non-screw-on tops.

Containers 16 of the present disclosure may include any known container 16 that is non-conducting or insulated, as described above. Such containers 16 may include, for example, glass and plastic bottles, foil packages, flexible packaging, cans, or combinations thereof.

Once container 16 is inverted and placed in block holder 18, a press 24 is used to drive probe 20 downward to puncture container 16 and deposit at least a portion of probe 20 therein. In an embodiment, probe 20 is a removable probe. Press 24 may be any device capable of driving probe 20 downward such as, but not limited to, a mechanical press, a hydraulic press, an electric press, etc. In an embodiment, press 24 includes a lever 26 that, when pulled by an operator, drives probe 20 downward.

Probe 20 is configured for several functions with respect to the present apparatuses and methods. First, probe 20 has a tip portion 28 that is sufficiently sharp so as to allow tip portion 28 to puncture container 16 to insert at least tip portion 28 of probe 20 therein. Tip portion 28 extends far enough into container 16 so as to be at least partially immersed in electrolyte solution 17 contained in container 16. Upon insertion of a portion of probe 20 into container 16, container 16 remains sufficiently sealed off from ambient pressure since probe 20 and container 16 are in a pressure-sealed relationship. Probe 20 is fixed spatially in its partially immersed position by the construction of probe 20.

In general, probe 20 can be of any shape capable of being at least partially inserted into the container 16 being tested in the manner described herein. In an embodiment, probe 20 is of a long, thin cylindrical shape. Such a shape requires a minimum opening in container 16 through which probe 20 is inserted during the puncture of container 16 by probe 20. The cylindrical shape also allows for a better fit and a leak-proof seal. The skilled artisan will appreciate, however, that probe 20 may have any shape or size known in the art that is capable of puncturing and being inserted into container 16.

Second, probe 20 may be removably associated with press 24 such that when press 24 drives probe 20 downward into container 16, probe 20 will stay with container 16 as press 24 is driven upward into a starting position. As such, in an embodiment, probe 20 may have a magnet attached to an upper side thereof that interacts with a magnet on a lower side of press 24. In another embodiment, probe 20 may have a releasable adhesive on an upper side thereof that releasable adheres to a lower side of press 24. Probe 20 may release from press 24 by manual separation of the two components after probe 20 is inserted into container 16. Alternatively, probe 20 may remain in container 16 if friction forces between probe 20 and container 16 (after probe 20 is inserted into container 16) are higher than the magnetic or adhesive forces between probe 20 and press 24. The skilled artisan will appreciate, of course, that other methods for removably adhering probe 20 to press 24 may be used, as well as other means of removing probe 20 from press 24.

Further, probe 20 acts as a first electrode, which will be one of two electrodes that complete an electrical; circuit for purposes of testing the integrity of seal 22 of container 16. Probe 20, or first electrode, may be made of any material capable of conducting an electrical current. Such materials may include, but are not limited to, aluminum, copper, gold, iron, steel, or combinations thereof. Probe 20 is connected to a first wire 46 capable of conducting electric current, which, in turn, is connected to either the positive or negative terminal of a multimeter 48 (e.g., conductivity meter). For any electrical current to be realized, as will be discussed further below, at least tip portion 28 of removable probe 20 must be in constant contact with the electrolyte solution contained in container 16. However, probe 20 should never contact an electrolyte solution (e.g., saltwater bath) 30 contained in tank 32.

Moreover, probe 20 also acts as a pressurizing means to pressurize the inside of container 16. As shown in FIG. 1, a pressure regulator 34 is located to the left side of press 24 and block holder 18. Pressure regulator 34 includes a pressure gauge 36, a fluid supply connection 38, a fluid supply on/off switch 40, and a fluid supply hose 42 that connects pressure regulator 34 and probe 20. Pressure regulator 34 is so constructed and arranged to supply a fluid such as, for example, air or water, to probe 20 to be delivered to the inside of container 16 via a hollow channel portion of probe 20 (not shown). In other words, probe 20 is configured not only to have sharp tip portion 28 for puncturing container 16, but probe 20 also has a hollowed-out inside portion (not shown) that is so constructed and arranged to receive fluid from fluid supply 39 and fluid supply tube 42 and deliver the fluid to the inside of container 16 so as to internally pressurize container 16 to test the integrity of seal 22. Fluid supply tube 42 is so constructed and arranged to follow probe 20 from container preparation portion 12 of apparatus 10 to seal integrity testing portion 14 of apparatus 10 in order to pressurize the inside of container 16. This method will be described further herein below.

Container preparation portion 12 also includes a storage tank 44 that may be used to store any of the elements used to complete apparatus 10. For example, storage tank 44 may be used to store extra probes 20, containers 16, fluid supply hoses 42, or electrolyte solution. The skilled artisan will appreciate that storage tank 44 need not be limited to these uses and may be used for any storage purpose known in the art.

As is shown in FIG. 2, once probe 20 is deposited into container 16, press 24 is drawn upward into a starting position and container 16, having probe 20 deposited at least partially therein and fluid supply tube 42 connected thereto, is moved to seal integrity testing portion 14 of apparatus 10. Container 16 is placed into electrolyte solution 30 (e.g., saltwater bath) so that seal 22 is submerged in electrolyte solution 30, but the bottom portion of container 16 having probe 20 therein does not contact electrolyte solution 30.

Since the integrity of seal 22 is tested using conductivity, electrolyte solution 30 must contain at least one electrolyte such as, for example, aluminum chloride, citric acid, potassium chloride, sodium chloride, or combinations thereof. In an embodiment, electrolyte solution 20 is an aqueous solution of water and any one of the above-mentioned electrolytes. The concentration of electrolyte solution 30 may comprise from about 0.01% to about 10% by weight of an electrolyte and the balance water. In another embodiment, electrolyte solution 30 comprises from about 0.1% to about 5%, or from about 0.1% to about 3%, or about 0.3% to about 1% by weight electrolyte and the balance water.

Once container 16 is placed in electrolyte solution 30, first wire 46 that connects to probe 20 is attached to either the positive or negative terminal of multimeter 48. A second probe 50 is inserted into electrolyte solution 30 and a second wire 52 connects from second probe 50 to an opposite terminal of multimeter 48. For example, if probe 20 and first wire 46 are attached to a positive terminal of multimeter 48, second probe 50 and second wire 52 are attached to a negative terminal of multimeter 48, and vice versa. Second probe 50 acts as a second electrode and may be made of materials similar to probe 20, as discussed above. Second wire 52 is also capable of conducting electrical current similar to first wire 46, as is discussed above. In an embodiment where electrons are passed from the multimeter 48 to probe 20, probe 20 acts as a cathode. In an embodiment where electrons are passed from probe 20 to multimeter 48, probe 20 acts as an anode.

In this manner, and as long as seal 22 is not compromised, probe 20 does not contact electrolyte solution 30 and second probe 50 does not contact electrolyte solution 17. Accordingly, the skilled artisan will appreciate that, as long as seal 22 is not compromised, no electrical current will register with multimeter 48. However, should seal 22 become compromised such that seal 22 leaks, a flow of electrons will be detected between probe 20 and second probe 50. The flow of electrons between probe 20 and second probe 50 may be generated by multimeter 48, a source of direct current, or by making the electrodes out of two dissimilar metals, in which case the electrons will flow from one electrode to the other due to the electrochemical potential between the two dissimilar metals.

The skilled artisan will appreciate that, in an embodiment where a source of direct electric current is used, any source of direct electric current known to those skilled in the art may be used. A non-limiting example of a source of direct electric current is a battery having a positive and negative terminal. The source of direct electric current may be a low voltage, low ampere current source for purposes of both cost savings and safety considerations. In an embodiment, a source of direct electric current is rated at a voltage in the range of from about 1 volt to about 5 volts, or from about 1 volt to about 1.2 volts, or about 1.2 volts, and has a current rating in the range of from about 100 milliamps to about 200 milliamps, or about 100 milliamps.

The method of leak detection that utilizes two dissimilar metals (e.g., a galvanic cell) is essentially the same as the method using a source of direct electric current. However, the difference between the leak detection method using two dissimilar metals (e.g., a galvanic cell) versus the method using a source of direct electric current is that in the method using two dissimilar metals (e.g., a galvanic cell), probe 20 and second probe 50 must be made from dissimilar metals and a conductivity measurement device is used instead of a source of direct electric current. In the galvanic cell leak detection method the conductivity measurement device is connected to probe 20 and the second probe 50 in the same manner as the source of direct electric current is connected to probe 20 and second probe 50. The conductivity measurement device not only measures the conductivity of the galvanic cell, but also completes the circuit of the galvanic cell, allowing the electrons to flow from one electrode to the other.

Once all the elements described herein are in place, the apparatus is capable of making an electrical circuit, and electricity will flow from one electrode to the other if the seal is leaking. The direction of the flow of electricity will depend upon which electrode is the cathode and which electrode is the anode. The electric current flow may be measured by any means and in any manner known to those skilled in the art for measuring electric current flow. Examples of useful means of measuring the electric current flow include, but are not limited to, ohm meters, conductivity meters, volt meters, and amp meters, or combinations thereof. If no electrical current flow is measured, then seal 22 is not leaking. If an electrical current flow is measured, then seal 22 is leaking. The size of the leak may be determined by the magnitude of current flow, with a greater level of current flow indicating a larger leak.

In the case where electric current is detected immediately upon placing container 16 into electrolyte solution 30, it will be apparent that seal 22 of container 16 is defective. This may signal to the test operator that this specific container 16 is defective. In the case where several containers 16 are tested and several containers 16 are found to have seal integrity issues, this may signal to a test operator that an overall manufacturing problem may exist and cause the manufacturing engineer to reevaluate to the manufacturing processor line to rectify the problem.

In the case where no electric current is immediately detected upon placing container 16 into electrolyte solution 30, and seal 22 is found to have good integrity, it may be desired to force seal 22 to rupture in order to quantify the amount of pressure required to compromise the integrity of seal 22. In this situation, pressure regulator 34 is turned on using fluid supply on/off switch 40, and is used to slowly deliver an incrementally increasing and known amount of pressurized fluid via fluid supply line 42 to an inside of container 16. By delivering a known amount of pressurized fluid to the inside of container 16, it is possible to determine the exact internal pressure at which seal 22 fails. For example, pressure regulator 34 may slowly deliver an increasing amount of pressurized fluid (e.g., air or water) to the inside of container 16 via fluid supply tube 42 to increase the pressure therein. A test operator will watch multimeter 48 to determine exactly when a flow of electrons is detected, which signifies a leak in seal 22, and then refer to pressure gauge 36 to determine the exact internal pressure at which seal 22 fails.

This is in direct contrast to previous seal integrity measurement devices that apply a known pressure to the outside of a container. In such a situation, the internal pressure in the container at the point of rupture cannot be accurately quantified. For example, if the container is a rigid container and a known amount of pressure is applied to an exterior of the container, it will be impossible to accurately measure the pressure on the inside of the container. The same is true for a more deformable container. At least because the strength of the containers will vary, it will be nearly impossible for a test operator to know what the internal pressure of containers are at the point of seal rupture.

Further, apparatus 10 also includes a mobile platform 54 that allows the test operator to vary the location and precise position of the apparatus such that the apparatus can be moved closer to or away from the container production line or to other container testing areas. In addition, the position of mobile platform 54 can be varied to reduce operator fatigue. Tank 32 on mobile platform 54 is configured to store a liquid solution, preferably an electrolyte solution 30. Tank 32 can be secured to the mobile platform in a number of ways to prevent unwanted movement of tank 32. However, the manner of securing tank 32 should preferably permit tank 32 to be removed from mobile platform 54 for cleaning and maintenance. Multimeter 48 (e.g., conductivity meter) may also be removably mounted on mobile platform 54.

Accordingly, methods for evaluating the integrity of a container seal are provided. The methods may include, for example, inserting a first probe into the container having a seal and containing an electrolyte product such that the first removable probe is at least partially immersed in the electrolyte product, separating removable probe from probe actuating device, placing the container having the first removable probe therein into an electrolyte bath such that at least the seal of the container is immersed in the electrolyte bath, the electrolyte bath having a second probe at least partially immersed therein, connecting the first and second probes to a conductivity meter, and measuring an electrical conductivity from one probe to another using the conductivity meter, wherein the seal is not leaking if there is no measured flow of electrons from one probe to the other, and the seal is leaking if there is a flow of electrons from one probe to the other.

The methods may further include puncturing the container with the removable probe, supplying a pressurized fluid from the fluid supply to an interior of the container through the fluid supply tube and hollow removable probe, and/or measuring an internal pressure in the container using a pressure gauge at a time when the conductivity meter begins to measure an electrical conductivity from one probe to the other. The removable probe may be hollow and may be attached to a fluid supply by a fluid supply tube.

In another embodiment, methods for evaluating the integrity of a container seal are provided. The methods may include, for example, actuating a probe actuating device having a first probe thereon in a direction that is toward a container having a seal and containing an electrolyte product, the first probe having a hollow cylindrical shape and being fluidly connected to a fluid supply by a fluid supply tube, inserting the first probe into the container such that a portion of the first probe is at least partially immersed in the electrolyte product, placing the container having the first probe therein into an electrolyte bath such that at least the seal of the container is immersed in the electrolyte bath, the electrolyte bath having a second probe at least partially immersed therein, connecting the first and second probes to a conductivity meter, detecting an electrical conductivity from one probe to another using the conductivity meter, wherein the seal is not leaking if there is no measured flow of electrons from one probe to the other, and the seal is leaking if there is a flow of electrons from one probe to the other, supplying a pressurized fluid from the fluid supply to an interior of the container through the fluid supply tube and the first hollow probe if no measured flow of electrons from one probe to the other is detected, and measuring an internal pressure in the container using a pressure gauge at a time when the conductivity meter begins to measure an electrical conductivity from one probe to the other.

The methods further include puncturing the container with the first probe. The first probe may be a removable probe that is removably attached to the probe actuating device, and/or separating removable probe from probe actuating device prior to placing the container having the first probe therein into the electrolyte bath.

These methods are useful in spot sampling sealed containers being prepared for commercial sale to determine the degree of seal leakage encountered for the particular lot of sealed containers being prepared. This information can be used to identify any potential production problems. This method is also useful in generally evaluating the reliability of sealed containers in different applications and uses that are offered by different container suppliers.

It should be understood that various changes and modifications to the presently preferred embodiments described herein will be apparent to those skilled in the art. Such changes and modifications can be made without departing from the spirit and scope of the present subject matter and The invention is claimed as follows:

1. An apparatus for evaluating the integrity of a container seal comprising:
    a holder so constructed and arranged to receive a container having a seal and containing an electrolyte product;
    a probe actuating device having a first probe removably attached to a lower portion thereof, the first probe having a tip portion that is so constructed and arranged to puncture the container when the probe actuating device is actuated;
    a fluid supply fluidly connected to the first removable probe;
    an electrolyte bath having a second probe at least partially immersed therein; and
    a conductivity meter connected to each of the first removable probe and the second probe.

2. The apparatus of claim 1, wherein the first probe is attached by attachment means selected from the group consisting of magnetic, adhesive, and combinations thereof.

3. The apparatus of claim 1, wherein the first probe further comprises a hollow cylindrical shape that is so constructed and arranged to deliver a fluid from the fluid supply to an interior of the container.

4. The apparatus of claim 1, wherein the first probe and the second probe are electrodes.

5. The apparatus of claim 1, wherein the container and the container seal are made of non-conductive materials selected from the group consisting of plastic, glass, foil, and combinations thereof.

6. The apparatus of claim 1, wherein the seal is a screw-on plastic cap.

7. The apparatus of claim 1, wherein the electrolyte product is selected from the group consisting of fruit juice, flavored water, a pediatric electrolyte drink, carbonated beverages and teas, isotonic beverages, and combinations thereof.

8. The apparatus of claim 1, wherein the electrolyte bath comprises water and an electrolyte selected from the group consisting of aluminum chloride, citric acid, potassium chloride, sodium chloride, and combinations thereof.

9. The apparatus of claim 1, wherein the probe actuating device is a press that is actuated by means selected from the group consisting of manually, mechanically, electrically, and combinations thereof.

10. The apparatus of claim 1 further comprising a mobile platform.

11. An apparatus for evaluating the integrity of a container seal comprising:
    a holder for receiving a container having a seal and containing an electrolyte product;
    a probe actuating device having a first hollow probe attached to a lower portion thereof, the first hollow probe having a tip portion that is so constructed and arranged to puncture the container;
    a fluid supply fluidly connected to the first hollow probe, the fluid supply so constructed and arranged to deliver a pressurized fluid to an interior of the container through a fluid supply tube and the first hollow probe;
    an electrolyte bath having a second probe at least partially immersed therein; and
    a conductivity meter connected to each of the first hollow probe and the second probe.

12. The apparatus of claim 11, wherein the first hollow probe is removably attached to the probe actuating device by attachment means selected from the group consisting of magnetic, adhesive, and combinations thereof.

13. The apparatus of claim 11, wherein the first hollow probe and the second probe are electrodes.

14. The apparatus of claim 11, wherein the container and the container seal are made of non-conductive materials selected from the group consisting of plastic, glass, foil, and combinations thereof.

15. The apparatus of claim 11, wherein the seal is a screw-on plastic cap.

16. The apparatus of claim 11, wherein the electrolyte product is selected from the group consisting of fruit juice, flavored water, a pediatric electrolyte drink, carbonated beverages and teas, isotonic beverages, and combinations thereof.

17. The apparatus of claim 11, wherein the electrolyte bath comprises water and an electrolyte selected from the group consisting of aluminum chloride, citric acid, potassium chloride, sodium chloride, and combinations thereof.

18. The apparatus of claim 11, wherein the probe actuating device is a press that is actuated by means selected from the group consisting of manually, mechanically, electrically, and combinations thereof.

19. The apparatus of claim 11 further comprising a mobile platform.

20. A method for evaluating the integrity of a container seal, the method comprising the steps of:
    inserting a first removable probe into a container having a seal and containing an electrolyte product such that the first removable probe is at least partially immersed in the electrolyte product;
    separating the removable probe from a probe actuating device;
    placing the container having the first removable probe therein into an electrolyte bath such that at least the seal of the container is immersed in the electrolyte bath, the electrolyte bath having a second probe at least partially immersed therein;
    connecting each of the first and second probes to a conductivity meter; and
    measuring an electrical conductivity from one probe to another using the conductivity meter, wherein the seal is not leaking if there is no measured flow of electrons from one probe to the other, and the seal is leaking if there is a flow of electrons from one probe to the other.

21. The method of claim 20 further comprising puncturing the container with the removable probe.

22. The method of claim 20, wherein the removable probe is hollow and is attached to a fluid supply by a fluid supply tube.

23. The method of claim 22 further comprising supplying a pressurized fluid from the fluid supply to an interior of the container through the fluid supply tube and hollow removable probe.

24. The method of claim 23 further comprising measuring an internal pressure in the container using a pressure gauge at a time when the conductivity meter begins to measure an electrical conductivity from one probe to the other.

25. A method for evaluating the integrity of a container seal, the method comprising the steps of:
    actuating a probe actuating device having a first probe thereon in a direction that is toward a container having a seal and containing an electrolyte product, the first probe having a hollow cylindrical shape and being fluidly connected to a fluid supply by a fluid supply tube;

inserting the first probe into the container such that a portion of the first probe is at least partially immersed in the electrolyte product;

placing the container having the first probe therein into an electrolyte bath such that at least the seal of the container is immersed in the electrolyte bath, the electrolyte bath having a second probe at least partially immersed therein;

connecting the first and second probes to a conductivity meter;

detecting an electrical conductivity from one probe to another using the conductivity meter, wherein the seal is not leaking if there is no measured flow of electrons from one probe to the other, and the seal is leaking if there is a flow of electrons from one probe to the other;

supplying a pressurized fluid from the fluid supply to an interior of the container through the fluid supply tube and the first hollow probe if no measured flow of electrons from one probe to the other is detected; and measuring an internal pressure in the container using a pressure gauge at a time when the conductivity meter begins to measure an electrical conductivity from one probe to the other.

26. The method of claim 25 further comprising puncturing the container with the first probe.

27. The method of claim 25, wherein the first probe is a removable probe that is removably attached to the probe actuating device.

28. The method of claim 27 further comprising separating removable probe from probe actuating device prior to placing the container having the first probe therein into the electrolyte bath.

* * * * *